United States Patent
Ngo et al.

(10) Patent No.: US 11,295,368 B2
(45) Date of Patent: Apr. 5, 2022

(54) INTERACTIVE AND PERSONALIZED TICKET RECOMMENDATION

(71) Applicant: StubHub, Inc., San Francisco, CA (US)

(72) Inventors: Sandy H B Ngo, San Francisco, CA (US); Garrett Reeb, San Jose, CA (US); Ricardo Javier Ibarra Ibarra, San Francisco, CA (US); Alice Hsu, San Francisco, CA (US)

(73) Assignee: StubHub, Inc., San Francisco, CA (US)

( * ) Notice: Subject to any disclaimer, the term of this patent is extended or adjusted under 35 U.S.C. 154(b) by 52 days.

(21) Appl. No.: 16/692,947

(22) Filed: Nov. 22, 2019

(65) Prior Publication Data
US 2021/0158423 A1 May 27, 2021

(51) Int. Cl.
| | |
|---|---|
| *G06Q 30/00* | (2012.01) |
| *G06Q 30/06* | (2012.01) |
| *G06N 20/00* | (2019.01) |
| *G06Q 10/02* | (2012.01) |
| *G06F 40/279* | (2020.01) |

(52) U.S. Cl.
CPC ....... *G06Q 30/0631* (2013.01); *G06F 40/279* (2020.01); *G06N 20/00* (2019.01); *G06Q 10/02* (2013.01); *G06Q 30/0629* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 2008/0154625 A1* | 6/2008 | Serbanescu ........ | G06Q 30/0601 705/26.1 |
| 2013/0124234 A1* | 5/2013 | Nilsson ................. | G06Q 30/06 705/5 |
| 2015/0052001 A1 | 2/2015 | Yuan | |
| 2015/0095188 A1* | 4/2015 | Lee .................... | G06Q 30/0633 705/26.8 |
| 2015/0287119 A1* | 10/2015 | Bhan ................. | G06Q 30/0627 705/5 |

(Continued)

OTHER PUBLICATIONS

International Search Report and Written Opinion, as issued in connection with International Patent Application No. PCT/US2020/060603, dated Feb. 11, 2021, 7 pgs.

*Primary Examiner* — Mila Airapetian
(74) *Attorney, Agent, or Firm* — McDermott Will & Emery LLP

(57) ABSTRACT

A method may include receiving, at a system of a ticketing marketplace, a request for a ticket to an event from a device of a user; generating a query for the user based on the ticket requested, the query requesting information from the user regarding a user preference associated with the ticket for the event; directing the query to the device of the user; in response to directing the query, receiving a answer from the device of the user; applying the answer to a machine learning model to determine a recommended ticket for the user, the machine learning model generated based on an association between ticket locations at a venue of the event and natural language phrases of users associated with the event; selecting the recommended ticket for the event based on an output by the machine learning model; and automatically facilitating purchase of the recommended ticket.

20 Claims, 5 Drawing Sheets

(56) References Cited

U.S. PATENT DOCUMENTS

| | | | |
|---|---|---|---|
| 2016/0148122 A1* | 5/2016 | Paleja | G06F 3/04842 |
| | | | 705/5 |
| 2016/0253601 A1* | 9/2016 | Akpala | G06Q 30/0623 |
| | | | 705/5 |
| 2016/0350680 A1* | 12/2016 | Sweeney | G06Q 30/0643 |
| 2018/0083901 A1 | 3/2018 | McGregor et al. | |
| 2018/0189684 A1* | 7/2018 | Vasvani | G06Q 10/02 |
| 2018/0210874 A1* | 7/2018 | Fuxman | G06F 40/35 |
| 2018/0349343 A1* | 12/2018 | Bull | G06F 40/211 |

* cited by examiner

INTERACTIVE AND PERSONALIZED TICKET RECOMMENDATION

FIELD

The present disclosure generally relates to electronic commerce and, more particularly, relates to interactive and personalized ticket recommendation.

BACKGROUND

Online ticket purchasing may be cumbersome and time-consuming for a user. In some cases, a user may have to filter through available tickets without knowing a sufficient amount of information about a specific seat for a venue or a specific type of event at a venue. In some cases, if the user is able to find an acceptable seat, the associated tickets may be purchased before the user can complete his or her own purchase. In addition, a user may have two options when purchasing tickets: interacting with a human salesperson or interacting with an impersonal and potentially difficult digital interface.

With regard to the first option, many users may not want to speak with a human salesperson or may not be in a position to do so (e.g., on a train with other people, in a library or an office, in a noisy location). With regard to the second option, purchasing tickets on a digital interface may be impersonal and not provide a level of interactivity that would result in a satisfactory purchase. For example, a user may be visually presented with a few options for ticket purchase, but the user may not have an opportunity to receive options that match his or her preferences.

In some cases, the user's preferences may vary based on the event, the venue, or other considerations, which may make personalized ticket recommendation even more difficult.

The subject matter claimed herein is not limited to embodiments that solve any disadvantages or that operate only in environments such as those described above. Rather, this background is only provided to illustrate one example technology area where some embodiments described herein may be practiced.

DETAILED DESCRIPTION

Figure 1:
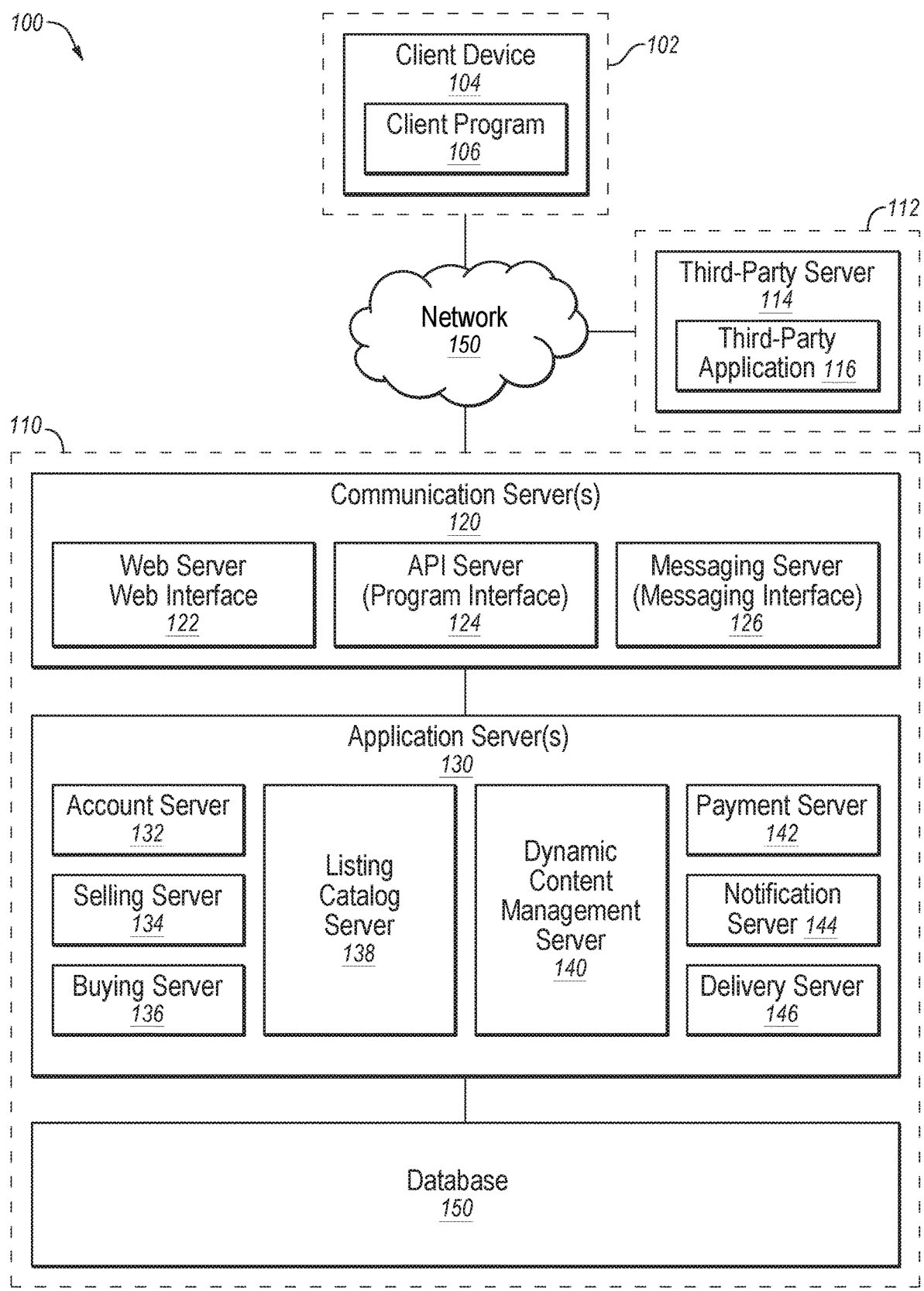
FIG. 1 illustrates a block diagram of an example computing system in accordance with at least one embodiment.

Various embodiments are described for providing an interactive and personalized ticket recommendation and purchasing experience for a user. Numerous specific details are set forth to provide a thorough understanding of the embodiments. It will be understood by those skilled in the art, however, that the embodiments may be practiced without these specific details.

Reference throughout the specification to "various embodiments," "some embodiments," "one embodiments," "an embodiment," and "an additional or alternative embodiment," means that a particular feature, structure, or characteristic described in connection with the embodiment is included in at least one embodiment. Thus, appearances of the phrases, "in various embodiments," "in some embodiments," "in one embodiments," "in an embodiment," "in an additional or alternative embodiment," in places throughout the specification are not necessarily referring to the same embodiment. Furthermore, the particular features, structures, or characteristics may be combined in any suitable manner in one or more embodiments.

In the following detailed description, references are made to the accompanied drawings, which form a part of the description and in which are shown, by way of illustration, specific embodiments of the present invention. Although these embodiments are described in sufficient details to enable one skilled in the art to practice the invention, it is understood that these examples are not limiting, such that other embodiments may be used, and changes may be made without departing from the spirit and scope of the invention.

Devices, systems, and methods described here in are provided for performing activities related to the recommendation of tickets, as well as the online sale, purchase, and resale of tickets for ticketed events. In various particular embodiments, the devices, systems, and/or methods may involve one or more devices in communication over a network. Such devices, systems, and methods may facilitate, in some cases automatically and without human intervention, personalized recommendations for tickets to a ticketed event, as well as facilitating the sale of, purchase of, and resale of such tickets.

In some embodiments, the method may include receiving, at a system of a ticketing marketplace, a request for a ticket to an event from a device of a user; generating a first query for the user based on the ticket requested, the first query requesting information from the user regarding a user preference associated with the ticket for the event; directing, by the system, the first query to the device of the user; in response to directing the first query, receiving, by the system, a first answer from the device of the user; applying, by the system, the first answer to a machine learning model to determine a recommended ticket for the user, the machine learning model generated based on an association between ticket locations at a venue of the event and natural language phrases of users associated with the event; selecting, by the system, the recommended ticket for the event based on an output by the machine learning model; and automatically facilitating, by the system, purchase of the recommended ticket.

In some embodiments, the method described above may be performed by a system, where the system includes a processor, memory in electronic communication with the processor, and instructions stored in the memory, the instructions being executable by the processor to cause the system to perform the operations described above and herein. In some embodiments, one or more non-transitory computer-readable media comprising one or more computer-readable instructions, that when executed by one or more processors of a computing device may cause the computing device to perform the method described above and herein.

In some embodiments, the method may include wherein the first query is a natural language query configured for audible presentation to the user and the first query is generated based on previous interactions of the user with the ticketing marketplace.

In some embodiments, the method may include wherein the first answer is received by the system as an audible transmission from the user to the device of the user.

In some embodiments, the method may include obtaining attribute data associated with each ticket location at the venue of the event, the attribute data stored in a database associated with the ticketing marketplace.

In some embodiments, the method may include obtaining the attribute data in a knowledge representation form.

In some embodiments, the method may include using the attribute data in the knowledge representation form to the machine learning model.

In some embodiments, the method may include obtaining historical purchase data related to the user.

In some embodiments, the method may include obtaining the user preference by scraping at least one of an email account of the user, a social media account of the user, a weblog, or a combination thereof.

In some embodiments, the method may include requesting a preferred proximity of the ticket to at least one of a concession stand, an exit, an entrance, an interest area, another user, an attraction area, or a combination thereof.

In some embodiments, the method may include obtaining data associated with a time of day of the event; a time of year of the event; popularity of the event; an event type; whether the event is indoors or outdoors; or a combination thereof.

In some embodiments, in response to receiving the first answer from the device of the user, the method may include generating a second query for the user based on the first answer; directing, by the system, the second query to the device of the user; in response to directing the second query, receiving, by the system, a second answer from the device of the user; applying, by the system, the first second to the machine learning model to determine an updated recommended ticket for the user; selecting, by the system, the updated recommended ticket for the event based on an updated output by the machine learning model; and automatically facilitating, by the system, purchase of the updated recommended ticket.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

FIG. 1 illustrates a block diagram of an example environment 100 in accordance with at least one embodiment; for example, environment 100 may be adapted for implementing interactive electronic communications regard the recommendation, sale, and purchase of tickets for ticketed event. In one embodiment, environment 100 may include a number of servers and/or software components that operate to perform various methodologies in accordance with the described embodiments. In some embodiments, servers may include stand-alone and enterprise-class servers operating a server operating system (OS) such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The environment 100 may include a client 102. The client 102 may include or employ that may comprise or employ example client device 104, such as such as a laptop, a mobile computing device, a wearable computing device, a personal computer (PC), and/or any other computing device having computing and/or communications capabilities in accordance with the described embodiments. In accordance with the example embodiments described herein, the client device 104 may include a smart phone device or other similar mobile device that a user can carry on or about his or her person and access readily.

In one embodiment, the client device 104 may provide at least one client program 106, which may include system programs and application programs to perform various computing and/or communications operations. In additional or alternative embodiments, system programs may include an operating system (e.g., MICROSOFT® OS, UNIX® OS, LINUX® OS, Symbian OS™, Embedix OS, Binary Runtime Environment for Wireless (BREW) OS, Java OS, a Wireless Application Protocol (WAP) OS, and others), device drivers, programming tools, utility programs, software libraries, application programming interfaces (APIs), and the like. Exemplary application programs may include web browser application, messaging applications (e.g., e-mail, instant messaging (IM), short message service (SMS), multimedia messaging service (MMS), telephone, voicemail, Voice over Internet Protocol (VoIP), video messaging), contacts application, calendar application, electronic document application, database application, media application (e.g., music, video, television), location-based services (LBS) application (e.g., global positioning system (GPS), mapping, directions, point-of-interest, locator), and so forth. Client program 106 may display various graphical user interfaces (GUIs) to present information to and/or receive information from client device 104.

In one embodiment, the client 102 may be communicatively coupled via one or more networks 108 to a network-based system 110. The network-based system 110 may be structured, arranged, and/or configured to allow the client 102 to establish one or more communications sessions with the network-based system 110 using the client device 104 (or multiple client devices) and/or the client programs 106. Accordingly, a communications session between client 102 and network-based system 110 (e.g., a communications session for location-based upgrades for attendees of a purchased-access event such as a ticketed event) may involve the unidirectional and/or bidirectional exchange of information and may occur over one or more types of networks 108 depending on the mode of communication. While the embodiment of FIG. 1 illustrates an environment 100 deployed in a client-server environment, it is to be understood that other suitable operating environments and/or architectures may be used in accordance with the described embodiments.

Data and/or voice communications between the client 102 and the network-based system 110 may be sent and received over one or more networks 108 such as the Internet, a wide area network operating (WAN), a wireless wide area network (WWAN), a wireless local area network (WLAN), a mobile telephone network, a landline telephone network, a VoIP network, as well as other suitable networks. For example, the client 102 may communicate with the network-based system 110 over the Internet or other suitable WAN by sending and or receiving information via interaction with a web site, e-mail, IM session, and/or video messaging session. Any of a wide variety of suitable communication types between the client 102 and the network-based system 110 can take place, as will be readily appreciated. In particular, wireless communications of any suitable form may take place between the client 102 and the network-based system 110, such as that which often occurs in the case of mobile phones or other personal mobile devices.

In various embodiments, the environment 100 can include, among other elements, a third party 112, which may comprise or employ a third-party server 114 hosting a third-party application 116. In various implementations, the third-party server 114 and/or the third-party application 116 may host a web site associated with or employed by the third party 112. For example, the third-party server 114 and/or the third-party application 116 may enable the network-based system 110 to provide the client 102 with additional services and/or information, such as additional ticket inventory. The third-party server 114 and/or the third-party application 116 may provide the network-based system 110 and/or the client 102 with email services and/or information, social networking services and/or information, location services and/or information, purchase services and/or information, or other online services and/or information.

In one embodiment, the third-party server 114 may include a social networking server that hosts a user's social network account. In another embodiment, the third-party server 114 may include an email server that hosts a user's email account. In some embodiments, one or more of client programs 106 may be used to access the network-based system 110 via the third party 112. For example, the client 102 may use a web client to access and/or receive content from the network-based system 110 after initially communicating with a third-party web site.

The network-based system 110 may comprise one or more communications servers 120 to provide suitable interfaces that enable communication using various modes of communication and/or via the one or more networks 108. The communications servers 120 can include a web server 122, an API server 124, and/or a messaging server 126 to provide interfaces to one or more application servers 130. The application servers 130 of the network-based system 110 may be structured, arranged, and/or configured to provide various online marketplace services, interactive recommendation services, and/or ticket fulfillment services to users that access network-based system 110. In various embodiments, the client 102 may communicate with the applications servers 130 of the network-based system 110 via one or more of a web interface provided by the web server 122, a programmatic interface provided by the API server 124, and/or a messaging interface provided by the messaging server 126. It can be appreciated that the web server 122, the API server 124, and the messaging server 126 may be structured, arranged, and/or configured to communicate with various types of client devices 104 and/or client programs 106 and may interoperate with each other in some implementations.

The web server 122 may be arranged to communicate with web clients and/or applications such as a web browser, web browser toolbar, desktop widget, mobile widget, web-based application, web-based interpreter, virtual machine, and the like. The API server 124 may be arranged to communicate with various client programs 106 and/or the third-party application 116 comprising an implementation of API for the network-based system 110. The messaging server 126 may be arranged to communicate with various messaging clients and/or applications such as e-mail, IM, SMS, MMS, telephone, VoIP, video messaging, and so forth, and the messaging server 126 may provide a messaging interface to enable access by the client 102 and/or the third party 112 to the various services and functions provided by the application servers 130.

When implemented as an online ticket marketplace, application servers 130 of network-based system 110 may provide various interactive ticket recommendations, online marketplace and ticket fulfillment services including, for example, recommendation services, account services, buying services, selling services, listing catalog services, delivery services, payment services, gathering services, location-based upgrade services, and notification services. The application servers 130 may include an account server 132, a selling server 134, a buying server 136, a listing catalog server 138, a dynamic content management server 140, a payment server 142, a notification server 144, and/or a delivery server 146 structured and arranged to provide such online marketplace and ticket fulfillment and/or redistribution services.

The application servers 130, in turn, may be coupled to and capable of accessing one or more databases 150 The databases 150 generally may store and maintain various types of information for use by the application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
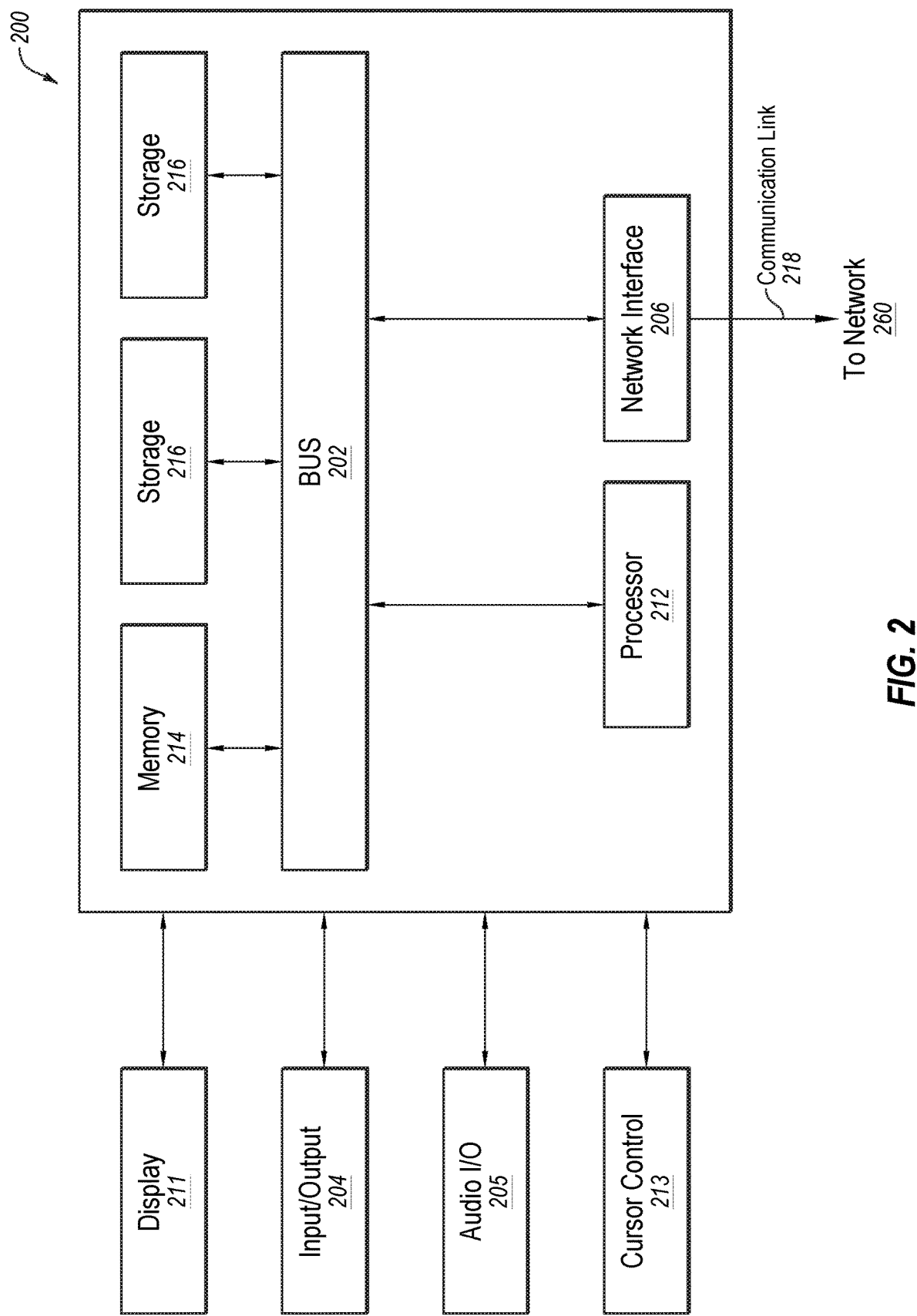
FIG. 2 illustrates a block diagram of an example computing system in accordance with at least one embodiment.

FIG. 2 illustrates a block diagram of an example computer system 200, in accordance with at least one embodiment. In some embodiments, the computer system 200 may be an example of a computing device (e.g., a smart or mobile phone, a computing tablet, a personal computer, laptop, PDA, Bluetooth device, key FOB, badge, etc.) that is capable of communicating with a network. The ticket provider, payment provider, and/or ticket purchaser (or otherwise receiver) may utilize a network computing device (e.g., a network server) capable of communicating with the network. It should be appreciated that each of the devices utilized by users, ticket providers, and payment providers may be implemented as computer system 200 in a manner as described.

In one embodiment, the computer system 200 may include a bus 202 or other communication mechanism for communicating information data, signals, and information between various components of computer system 200. Components may include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, a venue server, an email server, a social networking server, other third-party servers, and/or a payment provider server via a network. In various embodiments, such as for many cellular telephone and other mobile device embodiments, this transmission can be wireless, although other transmission mediums and methods may also be suitable. A processor 212, which can be a micro-controller, digital signal processor (DSP), or other processing component, processes these various signals, such as for display on computer system 200 or transmission to other devices over a network 260 via a communication link 218. Again, communication link 218 can simply be a wireless communication form in some embodiments. Processor 212 may also control transmission of information, such as cookies or IP addresses, to other devices.

Components of the computer system 200 may also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as the system memory component 214, and transmission media includes coaxial cables, copper wire, and fiber optics, including wires that comprise the bus 202. In one embodiment, the logic is encoded in non-transitory machine-readable medium. In one example, transmission media may take the form of acoustic or light waves, such as those generated during radio wave, optical, and infrared data communications.

In some embodiments, examples of computer readable media may include a floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In some embodiments, execution of instruction sequences to practice the present disclosure may be performed by the computer system 200. In various other embodiments of the present disclosure, a plurality of computer systems 200 coupled by the communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein can be embodied in one or more computer readable media or be in communication with one or more processors to execute or process the steps described herein.

A computer system may transmit and receive messages; data, information and instructions, including one or more programs (i.e., application code) through a communication link and a communication interface. Received program code may be executed by a processor as received and/or stored in a disk drive component or some other non-volatile storage component for execution.

Various embodiments may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Such software may be stored and/or used at one or more locations along or throughout the system, at the client 102, the network-based system 110, or both. Where applicable, the ordering of various steps described herein may be changed, combined into composite steps, and/or separated into sub-steps to provide features described herein.

The foregoing networks, systems, devices, and numerous variations thereof can be used to implement an interactive ticket recommendation and purchasing interface for a potential ticket purchaser, as well as used to implement a machine learning and natural language processing method and system for improving the technology of ticketing purchasing.

Figure 3:
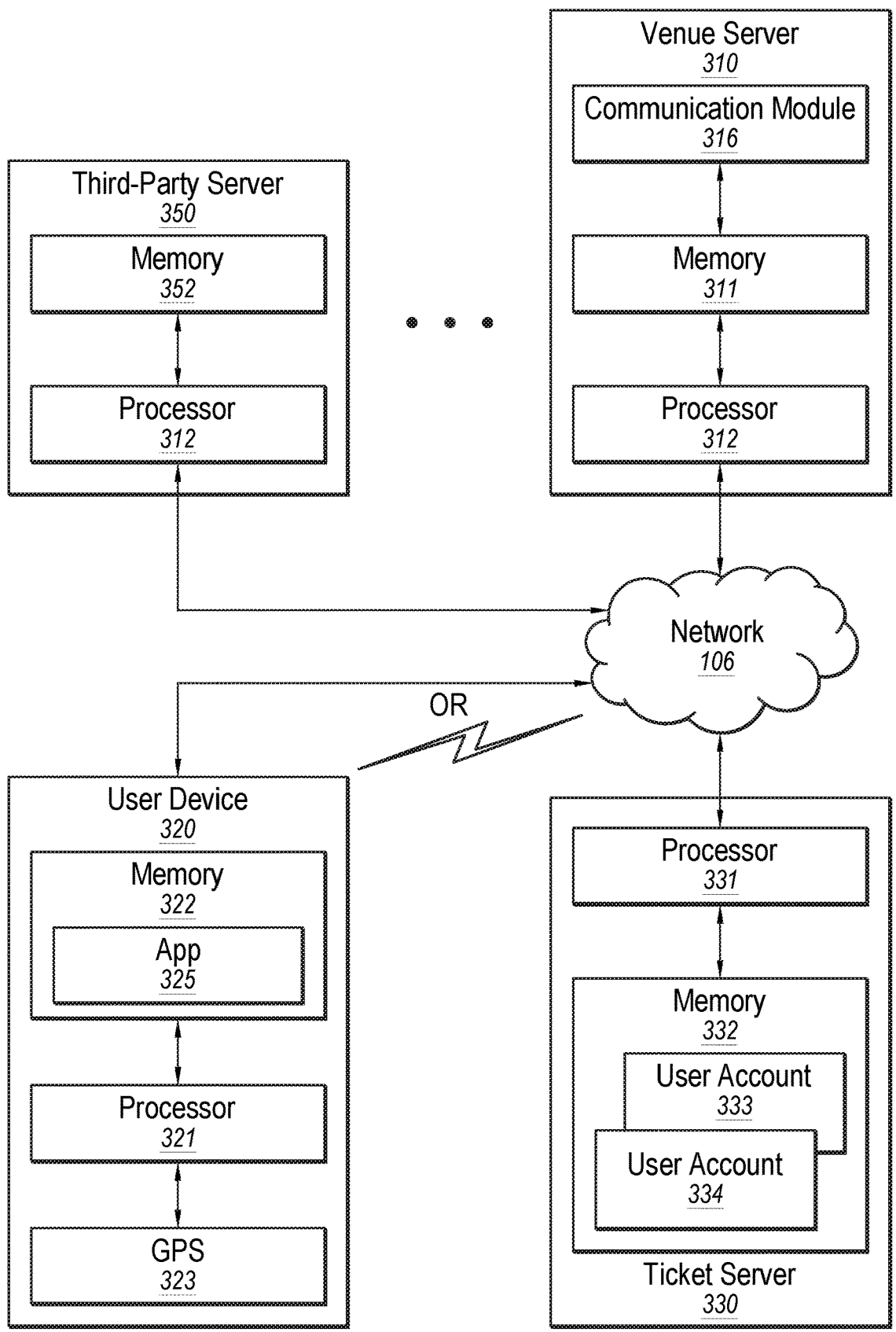
FIG. 3 illustrates a block diagram of an example computing system in accordance with at least one embodiment.

FIG. 3 illustrates a block diagram of an interactive recommendation and ticket purchasing system in accordance with at least one embodiment. In one embodiment, a ticket server 330 may be in communication with one or more user devices such as user device 320, one or more venue devices such as venue server 310, and one or more third-party servers such as a third-party server 350. In an additional or alternative embodiment, user device 320 may be the same device or a difference devices as the client device 104 described with references to FIG. 1.

In some embodiments, a venue device such as a venue server 310 (sometimes referred to herein as a venue device or a venue system) can be present at each of a plurality of different event venues (e.g., stadiums, theaters, arenas, amphitheaters, airplanes, cruise ships, hotels, fairgrounds, or other venues at which ticketed events are held or for which access to restricted portions of the venue can be purchased for a period of time). The venue server 310 may store and/or provide information regarding events scheduled to occur at a particular venue and regarding seating, accommodations (e.g., hotel rooms, cruise ship cabins, accessible seats), concessions, shops, facilities (e.g., bathrooms), etc. at the venue.

In an additional or alternative embodiment, the venue server may receive information by way of user input and a user may further update the related venue information as needed. In an additional or alternative embodiment, the venue server may receive information by way of automatic and computer-driven machine learning algorithms, such that the venue server 310 is able to update information regarding the event automatically and without human input.

In some embodiments, the venue server 310 can provide the information to the ticket server 330. The ticket server 330 can obtain information regarding events scheduled to occur at various venues and information regarding seating and/or other accommodations at the various venues from one or more venue servers 310, from other sources, or the ticket server 330 may have a database of event information and venue information independent of any interaction with a venue device. The ticket server 330 may, for example, be an implementation of the network-based system 110 of FIG. 1.

The venue server 310 can be a system that includes one or more computers, one or more servers, one or more computing tablets, one or more mobile devices, communications equipment, wireless transmitters or beacons and/or other suitable computing equipment, as examples. The venue server 310 can have processing circuitry such as a processor 312 and storage such as a memory 311. The venue server 310 may, according to some embodiments include communications equipment such as communications module 316.

The processor 312 can execute a software program stored in the memory 311 for providing information regarding events scheduled to be at the venue, regarding seating at the venue, regarding user preferences regarding ticketing, and other information including temporal information, weather information, historical purchase information, or other information for each historical, scheduled, or ongoing event. The venue server 310 may provide the information to the ticket server and/or to a user device such as the user device 320.

The communication module 316 may include a Digital Subscriber Line (DSL) modem, a Public Switched Telephone Network (PSTN) modem, an Ethernet device, a broadband device, a satellite device and/or various other types of wired and/or wireless network communication devices including microwave, radio frequency, infrared, Bluetooth, and near field communication devices.

The venue server 310 can be disposed at the venue. However, this is merely illustrative. If desired, venue server 310 can be disposed at a location other than the venue. Each venue can have a dedicated venue server 310 or many different venues can share a common venue server 310. For example, co-owned venues can share a common venue server 310.

In some embodiments, the venue server 310 can be omitted if ticket server 330 has the information needed for recommending, buying and facilitating selling of tickets. For example, the ticket server 330 may have a database of available tickets and information about the tickets (e.g., metadata) and venues that enables the ticket server 330 to interact with a user and produce personalized recommendations for ticket purchasing.

The third-party servers such server 350 may include, for example, a social media server that hosts one or more social networking accounts (e.g., a social networking account for a user of the user device 320), an email server that hosts email services (e.g., an email account for the user), and/or a travel services server. A user may use the user device 320 to access a social networking site that is hosted by one of the servers 350, to send, store, and receive emails or other electronic communications on an email account that is hosted by one of the servers 350, to interact with any of the third party server 350, ticket server 330, and/or venue server 310. The user may also use the user device 320 to access the ticket server 330 to select and purchase tickets for ticketed events from ticket server 330, to sell tickets for ticketed events, and/or receive personalized recommendations.

The third-party server 350 may be a computer, a server, a computing tablet, or a mobile device, as examples. In one embodiment, the server 350 may have processing circuitry such as a processor 354 and storage such as a memory 352.

The processor 354 on the server 350 may execute one or more software programs stored in the memory 352 for publishing user photos, videos, comments, captions, or other data such that are provided by the user. The processor 354 on another server 350 can store (e.g., using memory 352) and route emails or other communications for the user.

In one embodiment, the server 350 can be omitted if the ticket server 330 has the data needed to electronically interact with the user to provide a personalized recommendation and to automatically purchase at least one ticket for the user based on the personalized recommendation. For example, the ticket server 330 may have a database of purchases and/or user device information gathered from the user device 320 related to user preferences of the user, as well as other information such as location of the venue, the type of event, the time of the event, the weather, the time of year, historical purchase information, information regarding other ticket purchasers for the event at the venue, preferred price ranges, average price ranges, and the like.

A potential ticket purchaser may use a device such as the user device 320 to shop online for available tickets and/or interact with the ticket server 330 (or another server) to receive personalized recommendations for at least one event. The user device 320 may be a mobile device such as a cellular telephone, a smart phone, a smart watch (or other wearable computer device) a tablet computer, a laptop computer, or another portable computing device. The user device 320 may be a non-mobile device such as a home (land line) telephone, a desktop computer, an interactive set top box, or the like. The user device 320 can be any device or combination of devices that facilitates recommendations for online ticket purchasing.

The user device 320 may have a processor 321, a memory 322, a global positioning system component (GPS) 323 and/or other suitable device components. The processor 321 may execute an application such as an app 325 that facilitates the recommendations and ticket purchase as described herein. The app 325 may be stored in a memory 322. The app 325 may provide a graphical user interface (GUI) for the user when the user is interacting with at least one component of the system described in order to obtain a recommendation for a ticket and for purchase of a ticket.

The user device 320 can communicate with the venue server, the third-party server 350, and/or the ticket server 330 via a network such as the Internet 340. The user device 320 may communicate with the Internet via either a wired connection or a wireless connection.

The ticket server 330 may be operated by an online ticket seller such as StubHub, Inc. The ticket server 330 may facilitate recommendations and/or online ticket sales. The ticket server 330 may include processing circuitry such as a processor 331 in communication with storage such as a memory 332. The processor 331 may include one or more processors. The processor 331 can access accounts such as a user account 333 and/or a venue account 334 that are stored in the memory 332. The user account 333 may include information regarding the user (e.g., identification information, habits, preferences, account numbers, purchase history, social network contacts, email contacts, email account permissions, social media account permissions, purchased-ticket event information, attended event information, etc.). The venue account 334 may include information regarding the venue (e.g., information regarding events, seating, venue location, and other venue features). The memory 332 may be separate from the ticket server and may be used to store any number of user accounts 333 and venue accounts 334. The memory 332 may be distributed, e.g., have portions thereof disposed at a plurality of different locations. Other accounts may also be accessible by the processor 331, such as accounts of users selling tickets that include ticket details, such as price, quantity, location, and event information, and financial information that enable funds to be deposited into seller accounts when their tickets are sold.

The ticket server 330 may include one or more servers located at one or more locations. Thus, the ticket server 330 can be geographically and operationally distributed if desired. The ticket server 330 may be part of another system, such as a payment provider system. The venue server 310 and/or the third-party server 350 may communicate with the ticket server 330 over a wired or wireless connection such as via a network such as Internet 340. The venue server 310 and/or the third-party server 350 may communicate with any number of different ticket servers 330. The ticket server 330 may communicate with any number of venue server 310 and/or third-party servers 350. Various ticket servers 330 may communicate among themselves and may be considered herein as being the same as a single ticket server 330. The user can operate the user device 320 to interact with the ticket server 330 so that the user can electronically interact with the ticket server 330 to receive recommendations, purchase, and/or sell tickets.

The ticket server 330 may communicate with the venue server 310 to obtain information about the venue. For example, the ticket server 330 may communicate with venue server 310 to obtain information regarding the scheduling of events at the venue and regarding features of the venue. The features of the venue can be dependent upon the events of the venue, e.g., the features of the venue can vary from event to event. Generally, the venue server 310, the user device 320, the third-party server 350, and the ticket server 330 can perform functions discussed herein. That is, at least to some extent, a function that is discussed herein as being performed via a particular one of these devices can be performed by a different one of these devices, by a combination of these devices, and/or by other devices.

The venue server 310, the user device 320, the third-party server 350, other mobile devices, and the ticket server 330 may communicate with one another via a network, such as the Internet 340 or with one another via one or more networks, such as LANs WANs, cellular telephone networks, and the like. The venue server 310, mobile devices such as the user device 320, the third-party server 350, the ticket server 330, and other devices may communicate with one another, at least partially, via one or more near field communications (NFC) methods or other short-range communications methods, such as infrared (IR), Bluetooth, WiFi, and WiMax.

When a user wishes to shop for a ticket to an event online, the user may interact with an online ticket seller's website using an application such as the app 325. In some embodiments, the online ticket seller's website may be hosted by a third-party reselling company (e.g., StubHub), by the venue, by the artist, performer, or representative of a team, or by another entity. In one embodiment, the user can interact with the ticket seller's website using the user device 320, for example.

Figure 4:
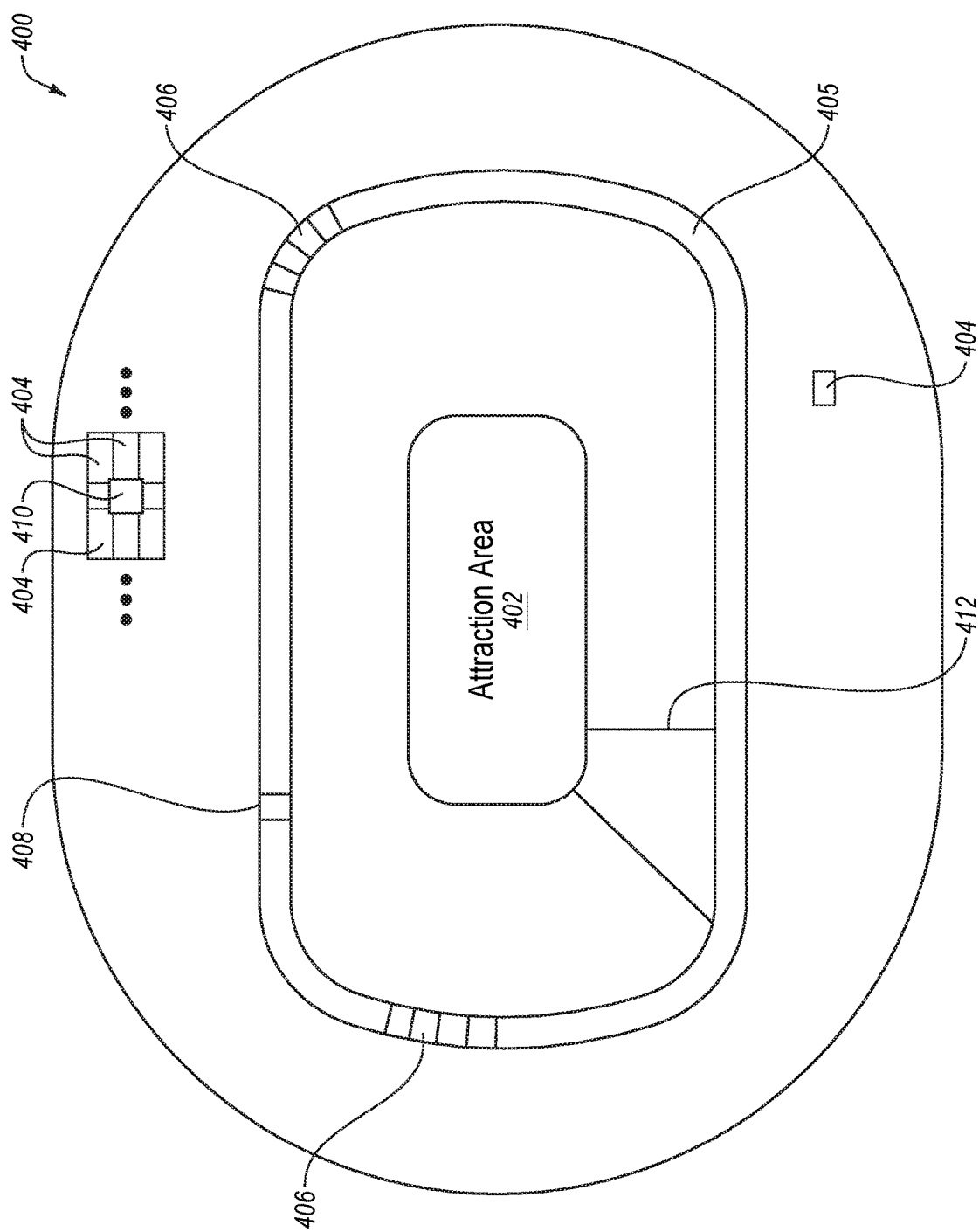
FIG. 4 illustrates a diagram of a venue in accordance with at least one embodiment.

FIG. 4 illustrates a diagram of a venue 400 in accordance with at least one embodiment. In some embodiments, the venue 400 may be one of a stadium, a theater, an arena, an amphitheater, a fairground, or another indoor or outdoor venue for events such as sporting events, concerts, plays, performances, competitions, races, or other entertainment events.

In one embodiment, the venue 400 may include an attraction area 402 and various seating sections 404 in which a ticket purchaser may have purchased at least one seat 410. In an additional or alternative embodiment, the seating sections may not have physical individual seats, but may be a restricted access section such as a general admission section, a standing room only section, a floor section, a VIP box, and the like. The attraction area 402 may be a court, a field, a stage, a track, a rink, or any other suitable portion of a venue at which events can be conducted. The venue 400 may include one or more concession areas such as concession stands 406 (e.g., a food-service stand, a team memorabilia store, a drink stand, or other vendor stand). In one example, the concession stands 406 may be located in an aisle 405 or elsewhere in the venue 400. The venue 400 may further include one or more amenities 408, such as bathrooms, drinking fountains, and the like. Further still, the venue 400 may include one or more interest areas 412. The interest areas 412 may include a player or artist entrance and exit location, a location likely to receive fan items (e.g., swag, foul balls, etc.), or any other area in which an event may occur that interests an attendee.

In one embodiment, data may be associated with any or all of the venue 400, the sections 404, the seats 410, the concession stands 406, the amenities 408, the interest areas 412, etc. In an additional or alternative embodiment, data may be associated with the event (e.g., with a type of event or a specific event).

Using a seat 410 as an illustrative example, in one embodiment, an administrator may associate seat 410 with data descriptive of seat 410. The data associated with seat 410 may be stored in a database, such as the database 150. In one embodiment, database 150 may include cloud storage. In an additional or alternative embodiment, data associated with seat 410 may be established and/or updated electronically and automatically without human involvement.

More specifically, a machine learning model may be trained to output a recommended seat for a user where the recommendation is based on a combination of personal user preferences and attributes of a location at the venue where the event is taking place. For example, inputs regarding user preferences may include manually provided user preferences such as likes and dislikes (e.g., a fan of one team, do not like attending weeknight events), as well as price ranges, section preferences, interest areas, etc. In an additional or alternative embodiment, inputs may be automatically determined without user input, such as data related to historical user purchases, online and submitted reviews, data obtained from scrubbing e-mails, blogs, social media posts, etc.

In some embodiments, data may include a coordinate of each seat 410, the location of each seat 410 with respect to other seats (e.g., proximity), the proximity of each seat 410 to a section 404, a concession stand 406, an amenity 408, the attraction area 402, an aisle 405, an interest area 412, etc. Data may be specific to each event occurring at the venue 400. For example, in one example, the event may be a basketball game having a basketball court in the location of attraction area 402 within the venue 400. In this example, there may be seats 410 encircling the entire attraction area 402, and thus each seat 410 may have data associated with the seat 410 that is specific to a basketball game at the venue 400. In another example, the event may be a concert, in which case the attraction area 402 may be a stage, and the stage may be located at one end of the venue 400, as opposed to in the middle. In such a scenario, there may not be seats behind the attraction area 402, and the seats 410 may be located only around 75% of the venue.

Data may also vary based on the time of year, the time of day, the weather, etc. For example, if the venue 400 is an outdoor venue and the event is in the morning during the winter, the seats 410 on the west side of the venue may receive more sun than on the east side of the venue. In another example, if the venue is an outdoor venue and the event is in the afternoon in the summer, the seats located to the north, for example, may be located in a shadier area. In an additional or alternative embodiment, there may be seats 410 located under an upper section, such that if there is rain or snow, the seats 410 located under an overhang may be protected from the weather.

Other data may be related to the seat 410 itself and/or the view from the seat 410. For example, in some sections 404, seat 410 may be a padded seat whereas in other sections seat 410 may be a hard plastic seat. In some embodiments, seat 410 may be located in a VIP box or may be a "seat" in a standing-room only location. In an additional or alternative embodiment, seat 410 may be associated with a specific view of the attraction area 402 (e.g., on the 50-yard line, behind the dugout, behind the foul pole, etc.).

In an additional or alternative embodiment, each seat 410 may be associated with a price or a price range. The price may vary based on the type of event, the day the ticket is being reviewed by a user (e.g., a month before an event versus the day of an event), the time of day (e.g., nighttime versus matinee), etc.

In one embodiment, the data associated with each seat 410 may be in a knowledge representation form. In one embodiment, knowledge representation and reasoning may incorporate findings from logic to automate various kinds of reasoning, such as the application of rules or the relations of sets and subsets. Examples of knowledge representation formalisms include semantic nets, systems architecture, frames, rules, and ontologies. Examples of automated reasoning engines include inference engines, theorem provers, and classifiers. For example, if the machine learning models obtains inputs related to a user's preferences, as well as historical purchase information, then attributes related to seat preferences may be reasoned out based on the user having a preference to sit nearer to the stage, while having previously purchased seats in a section that is nearer to the stage. Thus, a subsequent input by the user in a different section may be reasoned to be nearer to the stage, even though there is no specific indication that the seat is within a pre-determined distance from the stage.

As previously stated, any of the data obtained regarding seat 410 may be obtained by way of manual user input, by way of electronic data scrubbing, by way of machine learning, through verbal input, etc. Although data associated with seat 410 was described for reference, data may be associated with any element described herein.

In one embodiment, the data obtained and associated with each of the seats 410, for example, may be used to provide a seat recommendation to a user based on user preferences.

In one embodiment, a user (e.g., a potential ticket purchaser) may desire to purchase a ticket for an event. For purposes of explanation, the example event for which the user would like to purchase a ticket is a rodeo in a large outdoor venue. Part of the outdoor venue is uncovered (e.g., open to the elements), where as other portions of the venue are located under an overhang, or within a VIP box.

The user may have previously downloaded an app onto the user's smart phone, such as app 325 described with reference to FIG. 3. In another embodiment, the user may navigate to a webpage without having to download a specific application. The app 325 and/or the website may be operated by a ticket selling entity associated with the event and/or the venue. In one embodiment, the user may establish or have previously established a user account with the ticket selling entity. The user account may include personal information (e.g., name, address, etc.), financial information (e.g., bank information, credit card numbers, online payment account information), as well as user preferences. User preferences may include, but are not limited to, favorite teams or performers, favorite types of events, preferred price ranges, preferred seating locations or types of seats, preferred times of day or times of the year (e.g., seasons, weekends, etc.), and the like. In some embodiments, the user preferences may be manually provided by the user at an GUI associated with the app 325. In an additional or alternative embodiment, the user preferences may be provided by the user by way of voice input. In an additional or alternative embodiment, the user preferences may be determined automatically by the app 325 through data scrubbing (e.g., scrubbing the user's email, social media posts, reviews associated with the user, connections with other purchasers, etc.), through analysis of historical purchases by the user, and/or through machine learning.

In one embodiment, the user may request a seat recommendation through the app 325 by indicating that the user is looking for a ticket for the rodeo on September $18^{th}$. In one embodiment, the user may request the recommendation by typing the request into a chat box associated with the application. In an additional or alternative embodiment, the user may click on a link or otherwise indicate interest by manual input such as through checking a checkbox or radio button. In an additional or alternative embodiment, the user may verbally indicate interest by speaking into a microphone associated with the user device.

The app 325 may then interact with the user by asking the user a question or by presenting the user with additional information. For example, using the embodiment of vocal input and receiving audio, the user may speak to the app and say, "I would like a ticket for the rodeo at the Saddledome in Calgary on September $18^{th}$."

The app 325 may retrieve information about the user based on the user's request, such as whether the user has attended the rodeo at that venue before, on what date, and what seat the user purchased in the past. The user may have purchased multiple seats to the rodeo in the past and always purchased a seat in the $5^{th}$ row, Center Section. In addition, the example seats in the $5^{th}$ row, Center section appear to always be in the shade.

Thus, the app 325 may respond to the user by stating (or displaying), "You appear to prefer shady seats in the $5^{th}$ row, Center Section, would you like to look for a similar seat for this event?"

In this case, the user may decide that he or she wants a different experience and now has more money to purchase a better seat. Thus, the user may respond to the question by stating, "I would prefer a seat in the $100-150 price range." The app 325 may then determine that there is a seat available in the $2^{nd}$ row, Center section that is $120, and may present this seat to the user. For example, the app 325 may state, "there is an available seat for purchase in the $2^{nd}$ row, Center Section, seat 204. Would you like to see a view from this seat?" The user may then elect to interact with a venue map to see what view he or she may have from seat 204 if the user purchases the seat. If the user deems the seat satisfactory, the user may state, "Please purchase seat 204 and another seat immediate adjacent."

In one embodiment, when the app 325 recommends a ticket, the app 325 may display or describe the recommended seat to the user on an interactive map. The interactive map may be a two-dimensional or three-dimensional map generated using the data previously obtained and associated with the venue, seats, concessions, etc. Thus, in an additional or alternative embodiment, the user may make a selection on the displayed map to choose a seat for purchase, or to select a different seat. In an additional or alternative embodiment, the user may not be presented with a visual map and may make a selection based on written or audio statements.

Subsequently, the app 325 may automatically facilitate purchase of the two requested seats and send a notification to the user. For example, the ticket server 330 may obtain an instruction from the app 325 that the user has been presented with a recommended ticket. In one case, the user may confirm that the ticket is acceptable. In another example, the app may automatically make a purchase for the user if the seat recommended satisfies a number of pre-determined user criteria without user confirmation.

The ticket server 330 may then automatically obtain purchase information from the user 325 including personal information (e.g., name, address, telephone number) and payment information (e.g., credit card number, bank information). In one embodiment, the personal information and payment information may be stored in a user account associated with the user, and the ticket server 330 may obtain that information to make the purchase. In an additional or alternative embodiment, the ticket server 330 may communicate with a third-party server 350 to obtain the information to complete the transaction. For example, the user's payment information may be stored with the third-party server 350, where the third-party server 350 is a credit card company. Thus, the purchase transaction may be initiated and confirmed between the ticket server 330 and the third-party server 350. For example, the user may have previously stored financial and purchase information such as a stored credit card number, bank information, or online financial institution account information (e.g., Venmo, PayPal, etc.). Thus, the app 325 may access a third-party server associated with the user's financial information in order to automatically complete the ticket purchase transaction.

In one embodiment, whether the user is manually inputting data (e.g., typing, swyping) or verbally providing data, the app 325 may use natural language processing to determine the comments provided by the user. In addition, machine learning algorithms may be used to improve the understanding of the app 325 when receiving input from the user and making recommendations.

For example, the user may say or input that he or she prefers a "sunny seat." The app 325 may use natural language processing and/or machine learning to determine that a "sunny seat," is synonymous with a seat "not in the shade," "on the west side," "in the open," etc. In another example, the user may be more vague in his or her preferences and requests and may state, "I want to sit somewhere where I have a high chance of interacting with one of the competitors." Thus, the app 325 may determine that seats within a pre-determined proximity of interest area 412 have a higher likelihood of the user interacting with one of the competitors. The app 325 may follow up the request with additional questions and/or suggestions in order to refine the recommendations and provide granularized suggestions personalized for the user.

In some embodiments, for example, the app 325 may provide input to the machine learning model and obtain outputs from the machine learning model. Generally, the machine learning model may be trained on an input data source. For example, the machine learning model may be trained that 1200 number of seats exists for sale at venue 400 during the type of event "rodeo." Thus, some of the inputs used to train the machine learning model on outputting recommendations on ticket sales may be the number of seats, at a specific venue, for a specific event on a specific day. Further, other inputs may include that each of the seats 410 is associated with at least specific attribute (e.g., a proximity from the stage). Thus, the machine learning model has been given a set of examples from the dataset of "seats at venue 400 for a rodeo on September 18). The machine learning model may then output a recommendation for a user looking for a seat at the rodeo at the venue 400 on September 19 having some x proximity from the attraction area. Because the machine learning model has been given a set of example data, the machine learning model can predict what seats will fit the criteria of being within x proximity from the attraction area on a similar date: September 19. For each set of new input data given to the machine learning model, the machine learning model may be able to more accurate predict outputs based on inputs that the machine learning model has not necessarily seen before.

In the context of the description herein, for example, the machine learning model may have been previously trained on inputs such as historical user purchases, prices, speed a seat has sold out, quantity of social media posts about a performer in a pre-determined time frame, etc., to determine a statistical likelihood that an input (e.g., a request) has likelihood to occur that exceeds a pre-determined threshold based on a previous output. Thus, for each query the user answers, the answer may be applied to the machine learning model to update the recommendations. If the user answers the queries and purchases the ticket, the machine learning model may learn that the query, the answer, and the associated seat are part of the set of examples making up a specific output, and the machine learning model may continue to improve on making accurate and personalized recommendations.

In an additional or alternative embodiment, the user may request that the app 325 provide more than one recommendation that may be compared with one another. The app 325 may automatically alert the user with the differences, advantages, and disadvantages of each recommendation either objectively, or with consideration to the user's preferences.

If the user has not provided enough preference data prior to requesting a recommendation (e.g., the user has never purchased a ticket with this entity, the user has not established a user account, etc.), then the app 325 may suggest based on popular or common data obtained from other users. In order to provide a satisfactory recommendation, the app 325 may then ask the user additional questions in order to refine the suggestions.

In an alternative or additional embodiment, the app 325 may be integrated into other devices accessible by the user, such as smartwatches, car media systems, home automation systems, etc. In these examples, the user may interact with the app 325 using verbal statements, manual input (e.g., text entry), gestures (e.g., nodding in the view of a camera, giving a thumbs up), facial expressions (e.g., smiling in view of a camera, grimacing, shaking his or her head, etc.)

As previously provided, the user's historical purchases may be taken into consideration when making a recommendation. Other data may also be used, including whether the user sits with a certain group of friends, whether the user appears to be more boisterous at some events or quieter at others, whether the user is visiting from out of town (and would prefer to sit with similar fans), whether the user tends to leave his or her seat for snacks, drinks, or the bathroom more frequently, etc.

As each user, or more users, continue to interact with the system, the machine learning algorithms continue to train a machine learning model to improve on the recommendation of a ticket as well as automatic purchase of the ticket. In one embodiment, machine learning techniques may include linear regression, logistic regression, decision trees, Bayes theorems, K-means, random forest, dimensional reduction algorithms, k-Nearest neighbors, etc.

Natural language processing may include algorithms directed to the interaction between a computing system and natural human language. In some embodiments, the natural language processing algorithms may consider syntax, grammar, parsing, speech tagging, word segmentation, sentence breaking, synonyms and antonyms, terminology extraction, lexical semantics, distributional semantics, machine translations, named entity recognition, optical character recognition, speech recognition, text-to-speech, etc.

In one embodiment, the seat recommended to the user may become unavailable. The unavailability may occur before or after the purchase is completed. In this example, the app 325 may determine the unavailability and determine a replacement recommendation based on the data obtained and learned from the user and related to the event and/or the venue. In some cases, data used to make a replacement recommendation may include the purchase data of other users for the same event and/or at the same venue, the popularity of ticket sales for the event, the time before the event, etc.

In an additional or alternative embodiment, the replacement ticket may be automatically purchased for the user without the user providing input; however, in another embodiment, the replacement recommendation may be communicated to the user. The user may then interact with the app 325 again, using a series of questions and answers, to select and purchase the replacement ticket.

Figure 5:
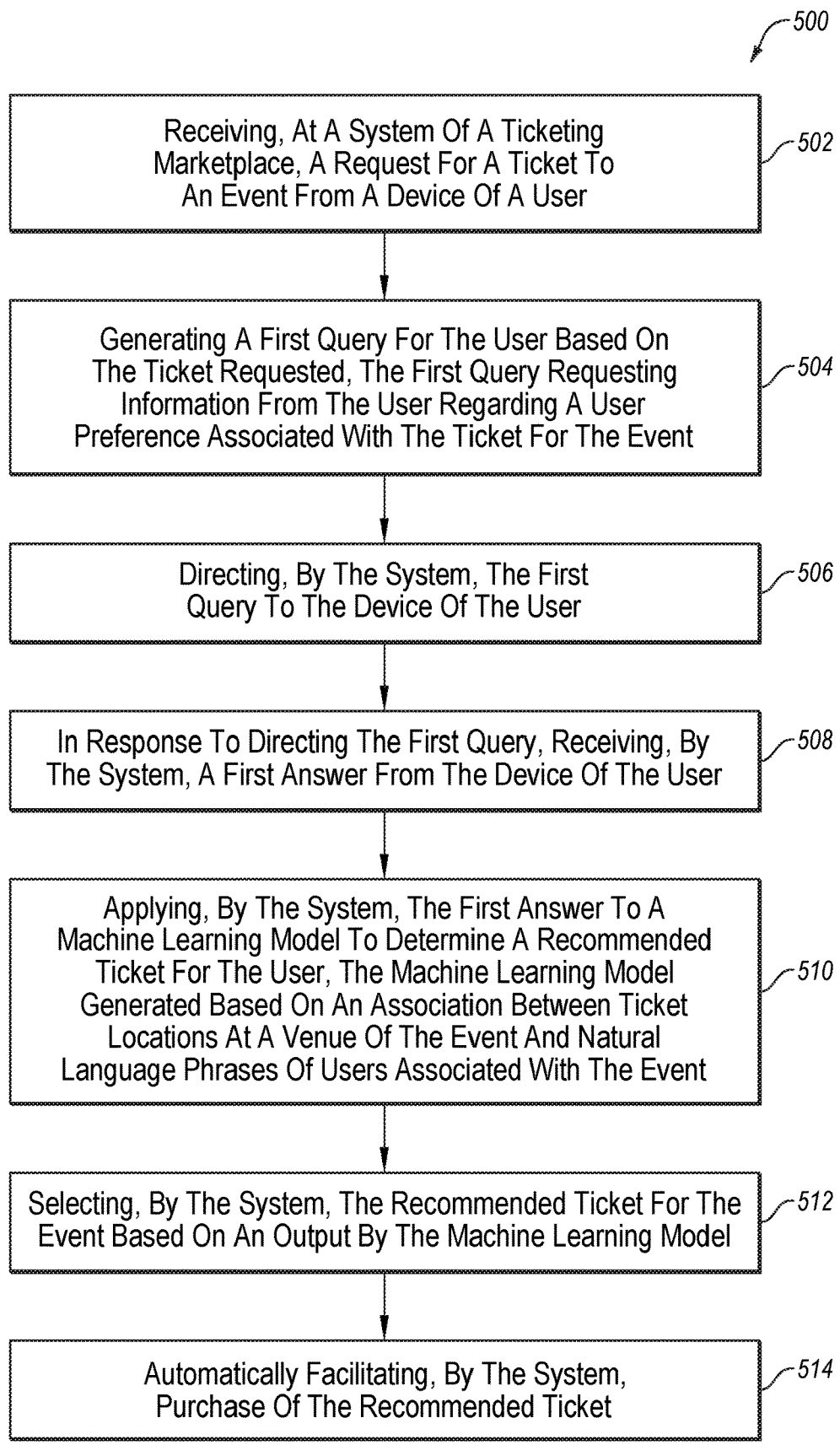
FIG. 5 illustrates a flowchart of an example method in accordance with at least one embodiment.

FIG. 5 illustrates a flowchart of an example method 500 in accordance with at least one embodiment. The method 500 may be performed by any suitable system, apparatus, or device. Although illustrated with discrete blocks, the steps and operations associated with one or more of the blocks of the method 500 may be divided into additional blocks, combined into fewer blocks, or eliminated, depending on the particular implementation.

At block 502, the method may include receiving, at a system of a ticketing marketplace, a request for a ticket an event from a device of a user. In one embodiment, the computing device may be part of, for example, the network-based system 110 of FIG. 1. The user device may be, for example, the client device 104 of FIG. 1.

At block 504, the method may include generating a first query for the user based on the ticket requested, the first query requesting information from the user regarding a user preference associated with the ticket for the event. In one embodiment, the ticket to the event may be for an event at example venue 400.

At block 506, the method may include directing, by the system, the first query to the device of the user. In one embodiment, the computing device may transmit an audible first query to the user by way of a speaker associated with the user device (e.g., client device 104).

At block 508, the method may include in response to directing the first query, receiving, by the system, a first answer from the device of the user. In one embodiment, the user may answer the first query by speaking into a microphone associated with the user device (e.g., client device 104), the answer transmitted from the user device to the system.

At block 510, the method may include applying by the system, the first answer to a machine learning model to determine a recommended ticket for the user, the machine learning model generated based on an association between ticket locations at a venue of the event and natural language phrases of users associated with the event.

At block 512, the method may include selecting, by the system, the recommended ticket for the event based on an output by the machine learning model. In one embodiment, the recommended ticket may be communicated to the user by way of display 211. In an additional or alternative embodiment, the recommended ticket may be communicated to the user by way of a speaker associated with the user device (e.g., client device 104).

At block 514, the method may include automatically facilitating, by the system, purchase of the recommended ticket. In one embodiment, automatically purchasing the ticket may include the network-based system 110 communicating with a third-party server 114, where the third-party server 114 may be a server associated with a financial institution.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. As an aid to understanding, the following appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

The invention claimed is:

1. A method comprising:
receiving, at a system of a ticketing marketplace, a request for a ticket to an event from a device of a user;
generating a first query for the user based on the ticket requested, the first query requesting information from the user regarding a user preference associated with the ticket for the event;
directing, by the system, the first query to the device of the user;
in response to directing the first query, receiving, by the system, a first answer from the device of the user;
accessing data from multiple contacts of the user in a social network;
applying, by the system, the first answer to a machine learning model to determine a recommended ticket for the user, the machine learning model generated based on an association between ticket locations at a venue of the event and multiple natural language phrases in the data from the contacts of the user in the social network, the natural language phrases being associated with the event;
selecting, by the system, the recommended ticket for the event based on an output by the machine learning model; and
automatically facilitating, by the system, purchase of the recommended ticket, wherein applying the first answer to a machine learning model comprises considering at least one of a syntax, a grammar, a speech tagging, a word segmentation, a sentence breaking, a synonym, an antonym a lexical semantic a distributional semantic, and a machine translation of the natural language phrases being associated with the event.

2. The method of claim 1, wherein the first query is a natural language query configured for audible presentation to the user and the first query is generated based on previous interactions of the user with the ticketing marketplace.

3. The method of claim 1, wherein the first answer is received by the system as an audible transmission from the user to the device of the user.

4. The method of claim 1, wherein the generating of the first query further comprises:
obtaining attribute data associated with each ticket location at the venue of the event, the attribute data stored in a database associated with the ticketing marketplace.

5. The method of claim 4, wherein the obtaining of the attribute data associated with each ticket location further comprises:
obtaining the attribute data in a knowledge representation form.

6. The method of claim 5, wherein obtaining the attribute data in the knowledge representation form further comprises:
using the attribute data in the knowledge representation form to train the machine learning model.

7. The method of claim 1, wherein the generating of the first query for the user further comprises:
obtaining historical purchase data related to the user.

8. The method of claim 1, wherein the generating of the first query for the user further comprises:
obtaining the user preference by scraping at least one of an email account of the user, a social media account of the user, a weblog, or a combination thereof.

9. The method of claim 1, wherein directing the first query to the device of the user further comprises:
requesting a preferred proximity of the ticket to at least one of a concession stand, an exit, an entrance, an interest area, another user, an attraction area, or a combination thereof.

10. The method of claim 1, wherein the applying the first answer to the machine learning model further comprises:
applying data associated with a time of day of the event; a time of year of the event; popularity of the event; an event type; whether the event is indoors or outdoors; or a combination thereof.

11. The method of claim 1, further comprising:
in response to receiving the first answer from the device of the user, generating a second query for the user based on the first answer;
directing, by the system, the second query to the device of the user;
in response to directing the second query, receiving, by the system, a second answer from the device of the user;
applying, by the system, the second answer to the machine learning model to determine an updated recommended ticket for the user;
selecting, by the system, the updated recommended ticket for the event based on an updated output by the machine learning model; and
automatically facilitating, by the system, purchase of the updated recommended ticket.

12. A non-transitory computer-readable medium, which contains instructions that when executed by one or more processors, cause a system to perform one or more operations, the operations comprising:
receiving, at a system of a ticketing marketplace, a request for a ticket to an event from a device of a user;
generating, for the user based on the ticket requested, a first query, requesting information from the user regarding a user preference associated with the ticket for the event;
directing, by the system, the first query to the device of the user;
accessing data from multiple contacts of the user in a social network;
in response to directing the first query, receiving, by the system, a first answer from the device of the user;
applying, by the system, the first answer to a machine learning model to determine a recommended ticket for the user, the machine learning model generated based on an association between ticket locations at a venue of the event and multiple natural language phrases in the data from the contacts of the user in the social network, the natural language phrases being associated with the event;

selecting, by the system, the recommended ticket for the event based on an output by the machine learning model; and automatically facilitating, by the system, purchase of the recommended ticket, wherein applying the first answer to a machine learning model comprises considering at least one of a syntax, a grammar, a speech tagging, a word segmentation, a sentence breaking, a synonym, an antonym a lexical semantic a distributional semantic, and a machine translation of the natural language phrases being associated with the event.

13. The non-transitory computer-readable medium of claim 12, wherein the first query is a natural language query configured for audible presentation to the user and the first query is generated based on previous interactions of the user with the ticketing marketplace.

14. The non-transitory computer-readable medium of claim 12, wherein the first answer is received by the system as an audible transmission from the user to the device of the user.

15. The non-transitory computer-readable medium of claim 12, wherein the generating of the first query further comprises:

obtaining attribute data associated with each ticket location at the venue of the event, the attribute data stored in a database associated with the ticketing marketplace.

16. The non-transitory computer-readable medium of claim 15, wherein the obtaining of the attribute data associated with each ticket location further comprises:

obtaining the attribute data in a knowledge representation form.

17. The non-transitory computer-readable medium of claim 12, wherein the generating of the first query for the user further comprises:

obtaining historical purchase data related to the user.

18. The non-transitory computer-readable medium of claim 12, wherein the generating of the first query for the user further comprises:

obtaining the user preference by scraping at least one of an email account of the user, a social media account of the user, a weblog, or a combination thereof.

19. The non-transitory computer-readable medium of claim 12, wherein directing the first query to the device of the user further comprises:

requesting a preferred proximity of the ticket to at least one of a concession stand, an exit, an entrance, an interest area, another user, an attraction area, or a combination thereof.

20. A system comprising:

one or more processors; and one or more non-transitory computer-readable media containing instructions which, when executed by the one or more processors, cause the system to perform one or more operations, the operations comprising:

receiving, at a system of a ticketing marketplace, a request for a ticket to an event from a device of a user;

generating, for the user based on the ticket requested, a first query, requesting information from the user regarding a user preference associated with the ticket for the event;

directing, by the system, the first query to the device of the user;

accessing data from multiple contacts of the user in a social network;

in response to directing the first query, receiving, by the system, a first answer from the device of the user;

applying, by the system, the first answer to a machine learning model to determine a recommended ticket for the user, the machine learning model generated based on an association between ticket locations at a venue of the event and multiple natural language phrases in the data from the contacts of the user in the social network, the natural language phrases being associated with the event;

selecting, by the system, the recommended ticket for the event based on an output by the machine learning model; and automatically facilitating, by the system, purchase of the recommended ticket, wherein applying the first answer to a machine learning model comprises considering at least one of a syntax, a grammar, a speech tagging, a word segmentation, a sentence breaking, a synonym, an antonym a lexical semantic a distributional semantic, and a machine translation of a natural language phrase of users associated with the event.

* * * * *